United States Patent Office 3,308,267
Patented Mar. 7, 1967

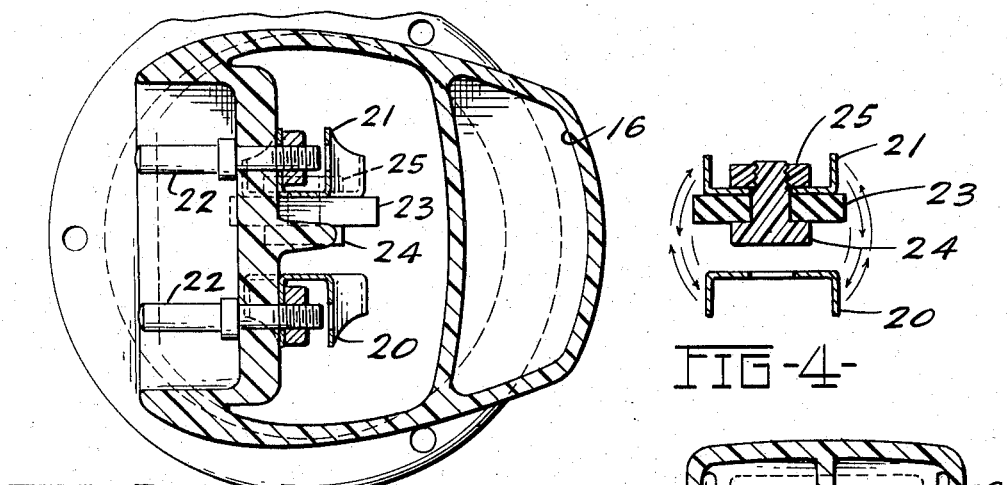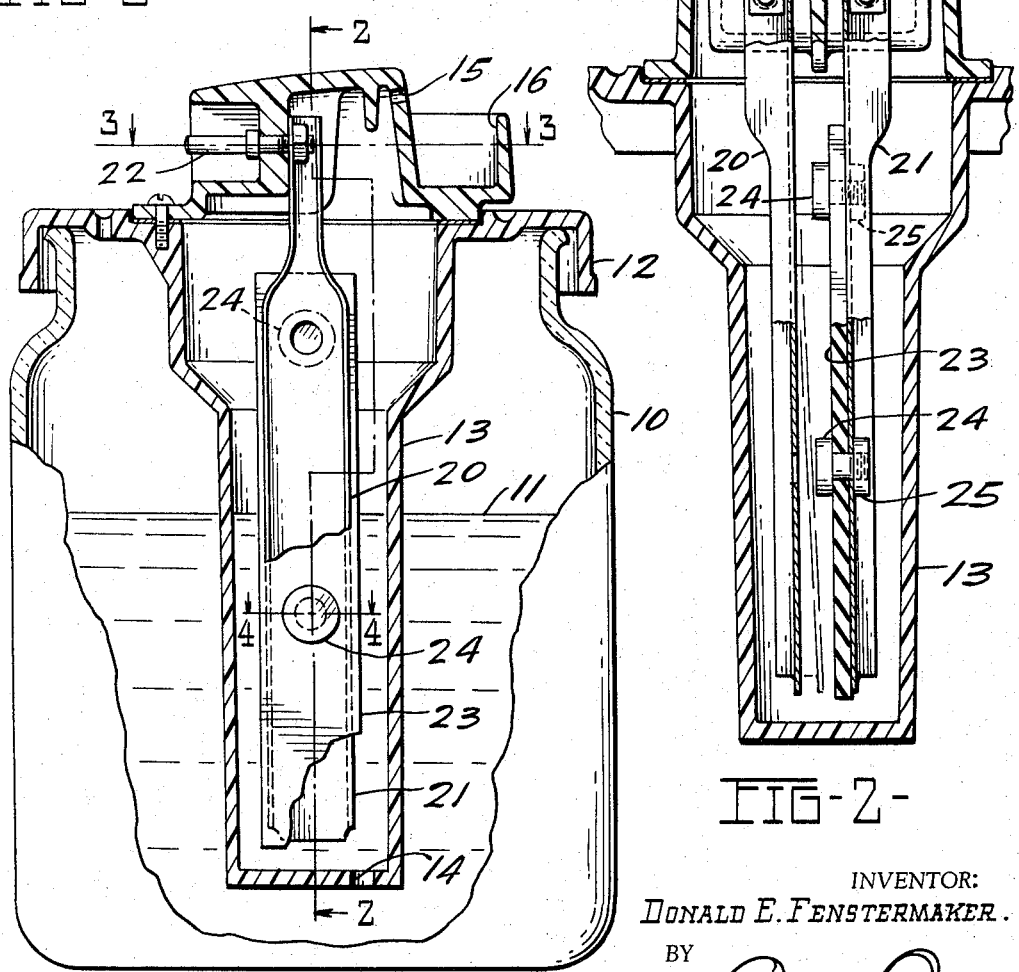

3,308,267
VAPORIZER
Donald E. Fenstermaker, Toledo, Ohio, assignor to The De Vilbiss Company, Toledo, Ohio, a corporation of Ohio
Filed Sept. 30, 1964, Ser. No. 400,358
4 Claims. (Cl. 219—290)

This invention relates to vaporizers for heating water or other liquids to cause a flow of steam through or over a medicinal agent for the treatment of respiratory ailments.

In conventional vaporizers of this type, heating electrodes are disposed within an insulating tubular well or chamber and immersed in a vessel containing water which acts as an electrolyte to permit current flow between the electrodes. The current flow causes the water in the tubular well to become heated and to pass out of the vaporizer as steam. The salinity of the water determines the conductivity of the path between the electrodes, and the salinity is sometimes adjusted to increase or decrease the current flow and thus the rapidity of heating. By confining the electrodes within the well or chamber, only a limited quantity of the water in the entire vessel is heated at any one time by the current flow between the electrodes, thus greatly increasing the efficiency and safety of the vaporizer.

Vaporizers of this type are sold throughout the world and must be capable of operation with varying voltages which are standard in various countries. In the United States of America, the standard voltage is 110 volts. In certain European countries voltages as high as 240 volts are standard.

In conventional vaporizers it is sometimes possible that rapid and intense heating of the depending electrodes will cause these elements to bend towards each other. With a comparatively low voltage of 110 volts this is not a serious problem, but with higher voltages the warping and movement of the electrodes may become so severe that the electrodes will approach each other very closely and may even touch and cause a short circuit in the supply line.

The object of the present invention is to provide a vaporizer adaptable for connection to a low or high voltage source and including means for maintaining a body of insulation between the depending electrodes so disposed that it does not interfere with the heating capacity of the vaporizer while it assures that no short circuit between the electrodes can occur.

Other objects and advantages of the invention will become apparent from the following detailed description of a specific embodiment thereof, reference being had to the accompanying drawings, in which:

FIGURE 1 is a central, vertical, sectional view of a vaporizer constructed in accordance with the present invention, with parts broken away and with parts of a container shown in full lines;

FIG. 2 is a fragmentary section taken on line 2—2 of FIG. 1;

FIG. 3 is a section taken on line 3—3 of FIG. 1; and

FIG. 4 is a section taken on line 4—4 of FIG. 1.

Referring to the drawings, the present invention is shown in conjunction with many conventional vaporizer parts such as a container 10 for water or other vaporizable material, the water level being shown at 11. The heating elements of the vaporizer are carried within a cover assembly indicated generally at 12 and which include a depending well or chamber 13 which may be molded as an integral part of the cover 12 and which is made of a length sufficient to extend nearly to the bottom of the container 10. A small opening 14 in the bottom of the well or chamber 13 permits the entry of water into the well where it is subjected to the heating effect of current flow between the electrodes as hereinafter described. The well 13 is made of insulating material so that the temperature of the water within the well may be greatly higher than the temperature of the main body of water outside of the well and within the container 10.

Steam formed within the well 13 passes through an opening 15 at the top of the cover and passes over the open top of a conventional medicine receiving chamber 16 molded in the vaporizer cover. The medicine desired to be vaporized may be placed in the chamber 16 by impregnating a body of cotton or the like, or the steam issuing from the opening 15 may simply pass over and thus entrain vapors from a body of liquid in the chamber 16. This is conventional in vaporizer practice and forms no part of the present invention.

The present invention is primarily directed to the electrode assembly. As indicated in FIGS. 2, 3 and 4, the electrodes are designated 20 and 21. At the top, each is connected to a pin 22 which pins are received in a conventional electrical plug. The electrodes 20 and 21 extend downwardly in the well in virtual parallelism when cold. The electrodes may, in some instances, be adjusted towards and away from each other to increase or decrease the rapidity of heating as is known in the art. Each electrode comprises a U-shaped strip of metal as indicated in FIG. 4. The current flow between the electrodes is indicated by the arrows in this figure.

As the electrodes 20 and 21 become heated, they exhibit some tendency to move closer to one another by thermal distortion. If the two electrodes touch, there will exist a short circuit between the two contacts 22 and thus a short circuit in the supply line for the vaporizer. This is, of course, highly undesirable.

To assure against the possibility of short circuit, and further to lengthen the path of current flow between the electrodes 20 and 21, the present invention provides a strip of insulating material 23 fixed to one or the other of the electrodes in the space between the electrodes. As shown in FIGS. 2 and 4 the insulating strip is affixed to electrode 21 in any suitable manner as by insulating bolts 24 held in place by metallic or insulating nuts 25. Two or more fasteners are required to hold the strip firmly in its selected jacent the electrode 21.

The insulating strip 23 is preferably made wider than the electrode to which it is affixed. In this way, the current path between the electrodes 20 and 21 is lengthened to any desired extent. If the insulating strip is made very wide, the path of current flow will be greatly increased and the rapidity of heating wlil be decreased to a marked extent. It is desirable that the increase in the path for current flow be such that for the maximum voltage expected to be imposed between electrodes 20 and 21 approximately the same rapidity of heating will be obtained on any voltage between 110 and 240 volts.

It will be seen that the insulating strip performs the two functions of assuring against short circuit in the event that the electrodes are brought closely together and increasing the path for current flow between the electrodes.

While the invention has been disclosed in conjunction with a specific form and disposition of the parts, it should be expressly understood that numerous modifications and changes may be made therein without departing from the invention as defined in the appended claims.

What I claim is:

1. In a steam vaporizer having a chamber for water or similar electrolyte and two spaced elongated, facing electrodes disposed in said chamber normally immersed to at least a predetermined depth in said electrolyte and between which electrical current passes to cause heating of said electrolyte, the improvement comprising a facing strip of water impervious insulating material carried by one of said electrodes and between the two electrodes, said strip of insulating material conforming in shape to the shape of said one of said electrodes and having a length at least coextensive with the normally immersed portion of said electrode.

2. The improvement defined in claim 1 in which said strip of insulating material is wider than the electrode to which it is affixed.

3. The improvement defined in claim 1 in which the strip of insulating material is affixed to one of said electrodes by insulating fastening elements.

4. The improvement defined in claim 3 in which said strip of insulating material is wider than the electrode to which it is affixed.

References Cited by the Examiner
UNITED STATES PATENTS

| | | | |
|---|---|---|---|
| 1,319,315 | 10/1919 | Whelan | 219—290 |
| 2,638,528 | 5/1953 | Runkle | 219—284 |
| 3,020,385 | 2/1962 | Conlin et al. | 219—275 X |
| 3,105,894 | 10/1963 | Matz et al. | 219—288 X |
| 3,189,725 | 6/1965 | Anderson et al. | 219—295 X |

ANTHONY BARTIS, *Primary Examiner.*